(12) United States Patent
König

(10) Patent No.: US 6,305,699 B1
(45) Date of Patent: Oct. 23, 2001

(54) LOCATING LINK FOR A MOTOR VEHICLE WHEEL SUSPENSION

(75) Inventor: Werner König, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/523,247

(22) Filed: Mar. 10, 2000

(30) Foreign Application Priority Data

Mar. 12, 1999 (DE) .............................................. 199 11 021

(51) Int. Cl.[7] ............................................................ B60G 3/14
(52) U.S. Cl. .............................. 280/124.133; 280/93.511; 280/124.134
(58) Field of Search .................... 280/124.153, 124.1, 280/124.125, 124.128, 124.133, 124.134, 124.135, 124.136, 124.141, 124.143, 124.144, 124.151, 93.502, 93.51, 93.511, 93.512, 284

(56) References Cited

U.S. PATENT DOCUMENTS

| | | |
|---|---|---|
| 2,122,476 | 7/1938 | Leighton . |
| 2,226,406 * | 12/1940 | Krotz ..................................... 267/219 |
| 2,299,935 * | 10/1942 | Slack et al. ..................... 280/124.134 |
| 2,652,264 * | 9/1953 | Booth et al. ................... 280/124.136 |
| 2,703,708 * | 3/1955 | Wagner ................................ 267/222 |
| 2,707,100 * | 4/1955 | Schilberg ............................. 267/254 |
| 2,876,018 * | 3/1959 | Kishline et al. ............... 280/124.134 |
| 2,913,251 | 11/1959 | Herbenar . |
| 3,006,627 | 10/1961 | Paulsen . |
| 5,165,306 * | 11/1992 | Hellon ...................................... 74/588 |
| 5,238,262 * | 8/1993 | Nunes .................................. 280/681 |
| 5,240,278 * | 8/1993 | Nelms ........................... 280/124.141 |
| 5,515,246 | 5/1996 | Maglica . |

FOREIGN PATENT DOCUMENTS

| | | |
|---|---|---|
| 758202 | 4/1954 | (DE) . |
| 2952176 | 7/1981 | (DE) . |
| 3921468 | 5/1990 | (DE) . |
| 4004679 | 8/1991 | (DE) . |
| 0244806 | 11/1987 | (EP) . |
| 04054334 | 2/1992 | (JP) . |

* cited by examiner

Primary Examiner—Daniel G. DePumpo
Assistant Examiner—David R. Dunn
(74) Attorney, Agent, or Firm—Kenyon & Kenyon

(57) ABSTRACT

A locating link for wheel suspensions of motor vehicles, with an at least two-part link body, the link body comprising two elongate support profiles which are spaced apart and parallel to one another over at least two-thirds of their length and come into contact at least in the vicinity of a mounting hole of the link body. The support profiles are of mirror-symmetrical configuration relative to a center plane which lies centrally between the support profiles and normal to the center lines of at least two of the mounting holes present in the support profiles.

3 Claims, 3 Drawing Sheets

LOCATING LINK FOR A MOTOR VEHICLE WHEEL SUSPENSION

CROSS REFERENCE TO RELATED APPLICATION

Priority is claimed with respect to German Application No. 199 11 021.2-21 filed in Germany on Mar. 12, 1999, the disclosure of which is incorporated herein by reference.

BACKGROUND OF THE INVENTION

The invention relates to a locating link for wheel suspensions of motor vehicles, with an at least two-part link body, the link body comprising two elongate support profiles which are spaced apart and parallel to one another over at least two-thirds of their length and come into contact at least in the vicinity of a mounting hole of the link body.

A locating link of this kind is known from DE 29 52 176 C2. This describes a locating link which comprises two elongate sheet-metal shaped parts which are of shell-shaped design and are firmly connected to one another. At their ends, the sheet-metal shaped parts have openings which are reinforced by integrally formed or shaped annular collars. The annular collars are dimensioned in such a way that, as the two sheet-metal shaped parts are assembled, they engage in one another and are retained by non-positive engagement. This locating link is suitable specifically for small wheel loads. As regards the effort involved in installing it in the vehicle, it offers no advantages over conventional single-part links.

DE 39 21 468 C1 has also disclosed a sheet-metal link. The link comprises two identical pressings to be arranged mirror-image fashion and a mounting element connecting these parts. At one end, each of the mutually opposite pressings has an annular collar into the two inner holes of which a mounting element is pressed. This link too is suitable specifically only for small wheel loads. This is evident, inter alia, from the fact that the mounting element is not fixed definitely in the axial direction in the link.

The problem underlying the present invention is to develop a locating link which is distinguished by simple design, a low manufacturing outlay and uncomplicated assembly. It should also be suitable for large wheel loads.

SUMMARY OF THE INVENTION

The problem is solved by the features of the provision of a locating link that has a link body formed by two elongate support profiles. The support profiles are of mirror-symmetrical configuration relative to a centre plane which lies centrally between the support profiles and normal to the centre lines of at least two In the assembled condition, the support profiles have a cylindrical cavity, which is arranged concentrically with a mounting hole, in the region in which they are in direct contact, the inside diameter of the cavity being greater than the diameter of the corresponding mounting hole.

Only one support profile need be designed for the mirror-symmetrical construction. The second support profile is obtained from mathematical dataset mirroring. The design of the casting moulds or forging dies is made simpler in the same way.

Since the link body comprises opposite profiles, it is possible to arrange cavities or apertures in the region between the support profiles without problems and without giving rise to expensive forging dies or casting moulds.

The link body can be compared to a ladder construction. In this arrangement, the support profiles of the link body are the sides of the ladder, while the spindles or screwed joints of the mountings, e.g. for the wheel carrier, a shock absorber, a vehicle spring or a spring strut, accommodated in the mounting body form the rungs. The spindles or screwed joints simultaneously form shape-stiffening and load-bearing components of the locating link, thereby making it possible to save on fastening elements. Apart from reducing the effort involved in assembly, the latter additionally reduces the sprung mass of the independent wheel suspension and this can have a positive effect on driving dynamics.

BRIEF DESCRIPTION OF THE DRAWING

Further details of the invention will become apparent from the subclaims which have not been quoted and from the following description of a schematically illustrated embodiment. In the drawing:

DETAILED DESCRIPTION OF THE PREFERRED EMBODIMENTS

Figure 1:
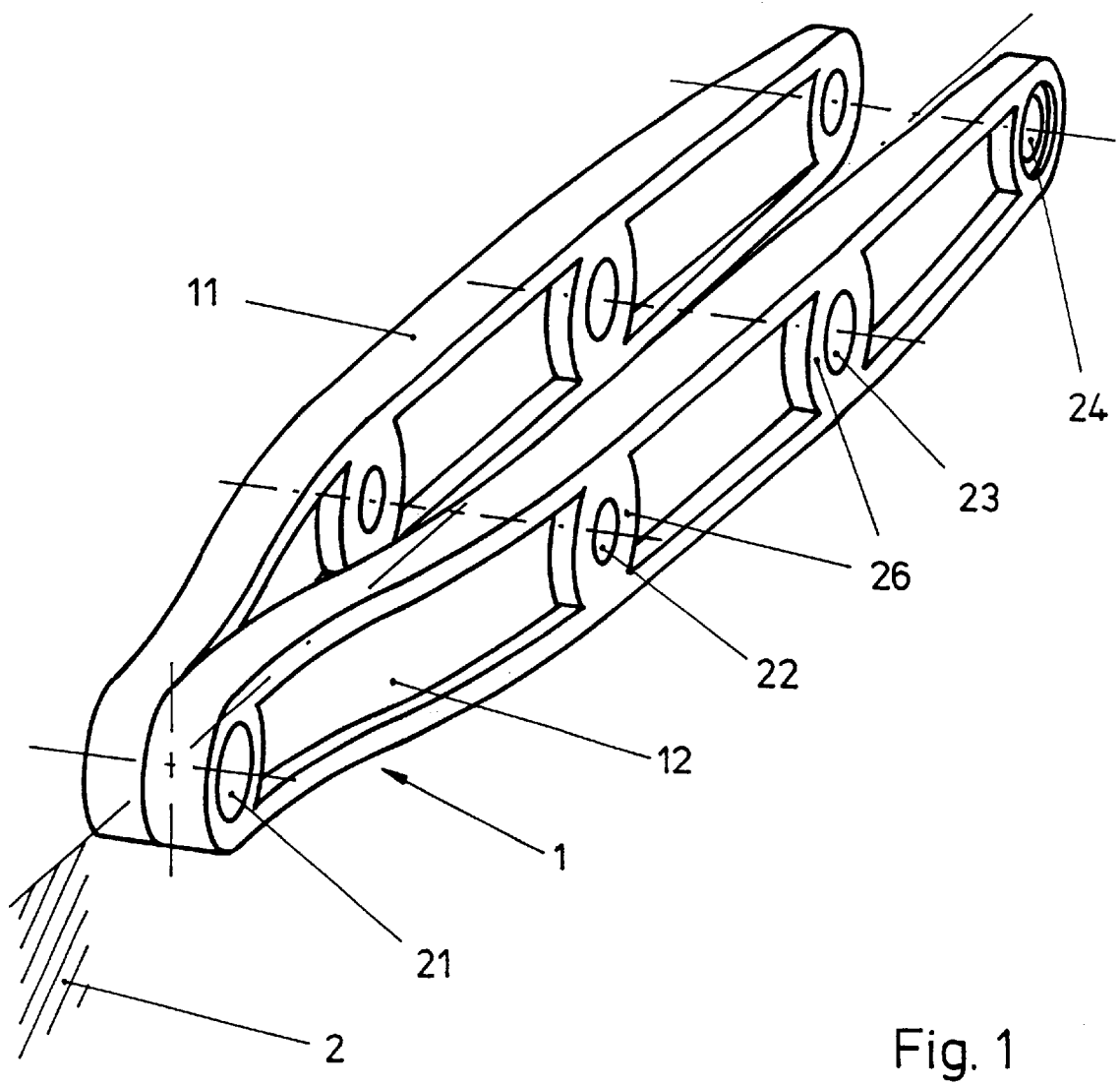
FIG. 1 shows a mounting body in dimetric representation.

FIG. 1 shows a locating-link body (1) formed by two support profiles (11, 12). As part of a wheel suspension, the link body (1) connects a wheel carrier of an independent wheel suspension to the vehicle body, for example. For this purpose, it has the mounting holes (21) and (24), being secured pivotably on the body by way of the pivotal connection hole (24), cf. FIG. 3, while it supports the wheel carrier in articulated fashion by means of the wheel-carrier mounting hole (21), cf. FIG. 2.

Figure 2:
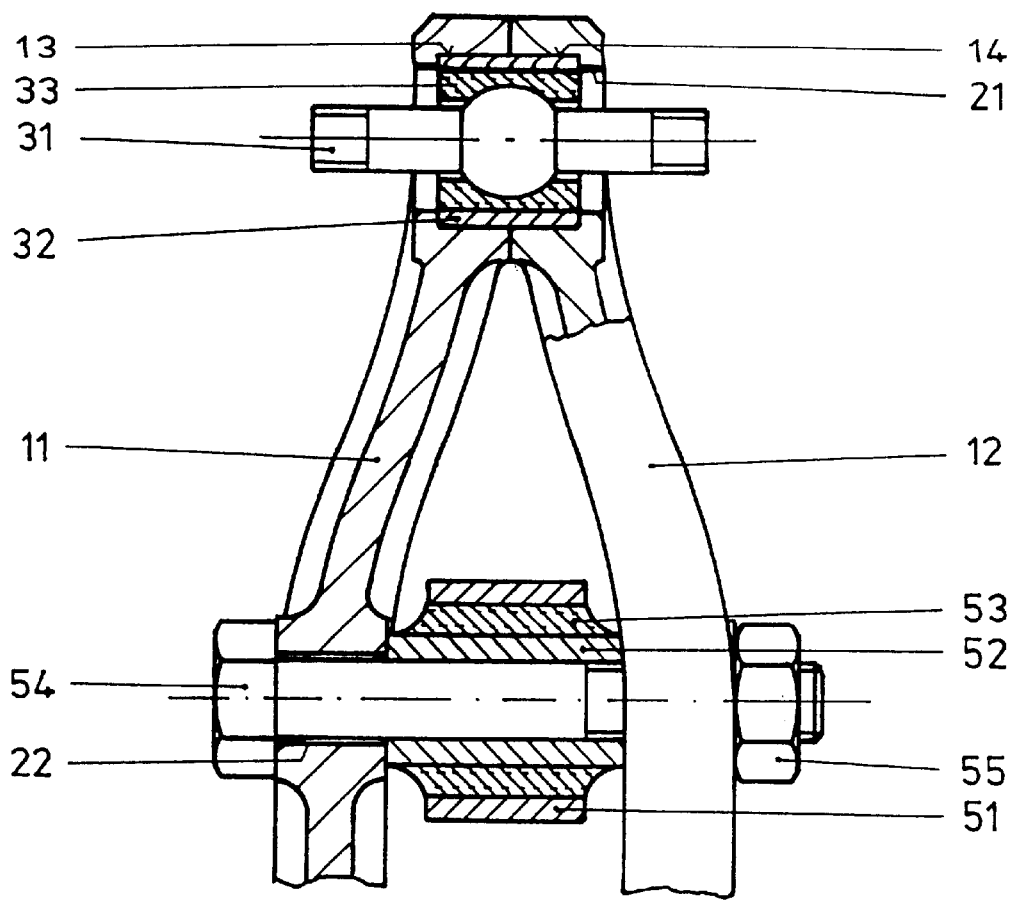
FIG. 2 shows a locating-link portion with wheel-carrier and shock-absorber connected.

In addition, the link body (1) accommodates the lower pivotal connection point of a shock absorber and of a vehicle spring, for example, in the mounting holes (22) and (23). FIG. 2 shows the shock-absorber mounting in the shock-absorber mounting hole (22). The shock absorber and the springing are not shown.

In the illustrated embodiment, the link body (1) has two support profiles (11, 12) of mirror-symmetrical design. Here, the plane of symmetry is a centre plane (2) which lies between the support profiles (11, 12) and is furthermore aligned normally or perpendicularly to at least some of the centre lines of the mounting holes (21–24). Over the majority of their length, the support profiles have an I-shaped cross-sectional profile, for example. In the region of the mounting holes (21–24), the I profile makes a transition to a rectangular profile in some cases. At these points, the mounting holes (21–24) are reinforced by tubular or annular accumulations (26) of material.

Figure 3:
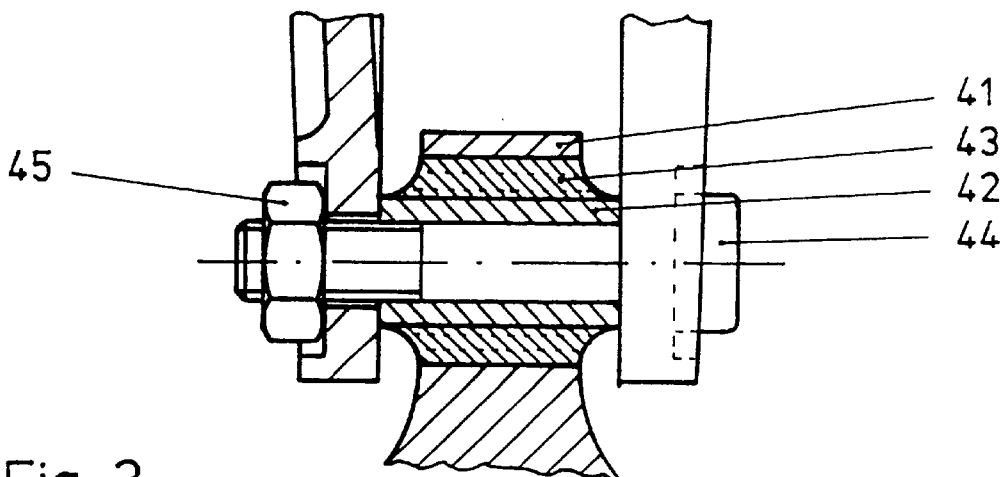
FIG. 3 shows a locating-link portion with the pivotal connection to the vehicle body.

In the illustrative embodiment, the I-shaped cross-sectional profile in accordance with FIGS. 1 and 3 makes a transition to a C profile towards the pivotal connection hole (24), with the width of the profile being reduced. The opening of the profile is here oriented outwards.

In the region of the wheel-carrier mounting hole (21), the support profiles (11, 12), which are here bent in a crescent shape, touch one another directly, while, in the regions of the mounting holes (22–24) they have a constant spacing, for example. Articulation components of the springing, the shock absorption system and of the pivotal connection point on the vehicle-body side are arranged there between the support profiles (11, 12). These articulation components can include sleeves (32, 42, 52) and bolts (44, 54), by means of which the support profiles (11, 12) are secured to one another in a dimensionally rigid manner and held apart.

The centre lines of all the mounting holes (21–24) are parallel to one another and in one plane only by way of example. The spacing between the support profiles can be varied as desired by means of the length of the link body, e.g. for adaptation to particular pivotal connection point dimensions and loads. The height of the cross-sectional profile and the thickness of the profile wall are furthermore variable. The link body (1) can likewise be of arched design between the outer mounting holes (21, 24).

High-strength forgeable materials which are suitable, for example, for angular, C- and I-shaped cross-sectional profiles are generally used as materials for the support profiles (11, 12).

FIG. 2 shows the wheel end of the link body (1). In the region of the wheel-carrier mounting hole (21), the ends of the support profiles (11, 12) each have a coaxial recess (13, 14) which is directed out from the parting line in the plane (2) and the two of which together form a cylindrical interior space. Arranged in this interior space in a radially and axially fixed manner is a swivel joint. The swivel joint comprises a swivel-joint body (31) with a spherical portion, a sleeve (32) and a one- or multi-part elastomer-body shell (33) inserted between these parts. The sleeve (32) is at most twice as long as the sum of the two recesses (13, 14). Via the recesses (13, 14), into which respective halves of it are pressed, it centres the support profiles (11, 12) relative to one another. Since the wheel-carrier hole (21) has a smaller diameter than the recesses (13, 14), the swivel joint is fixed positively even without its own screwed connection.

At the transition between the bent and the straight portion of the support profiles (11, 12) there is the shock-absorber mounting hole (22), the edges of which are reinforced by the support reinforcements (26). In the shock-absorber mounting hole (22) there is a bolt (54) on which a sleeve (52) is mounted. If the shock absorber requires a small swivelling angle, the sleeve (52) can perform the function of a spacer sleeve. In this case, the support profiles (11, 12) are connected rigidly to one another by means of the bolt (54) and a nut (55). The sleeve (52) is inserted with positive or non-positive engagement in a shock-absorber rod eye (51), being held by means of an elastomer body.

FIG. 3 shows the vehicle-body end of the link body. Here too, the support profiles (11, 12) are bolted together via a sleeve (42). An elastomer body (43) surrounding the sleeve (42) is mounted in a pivotal connection block (41) seated on the vehicle body.

Figure 4:
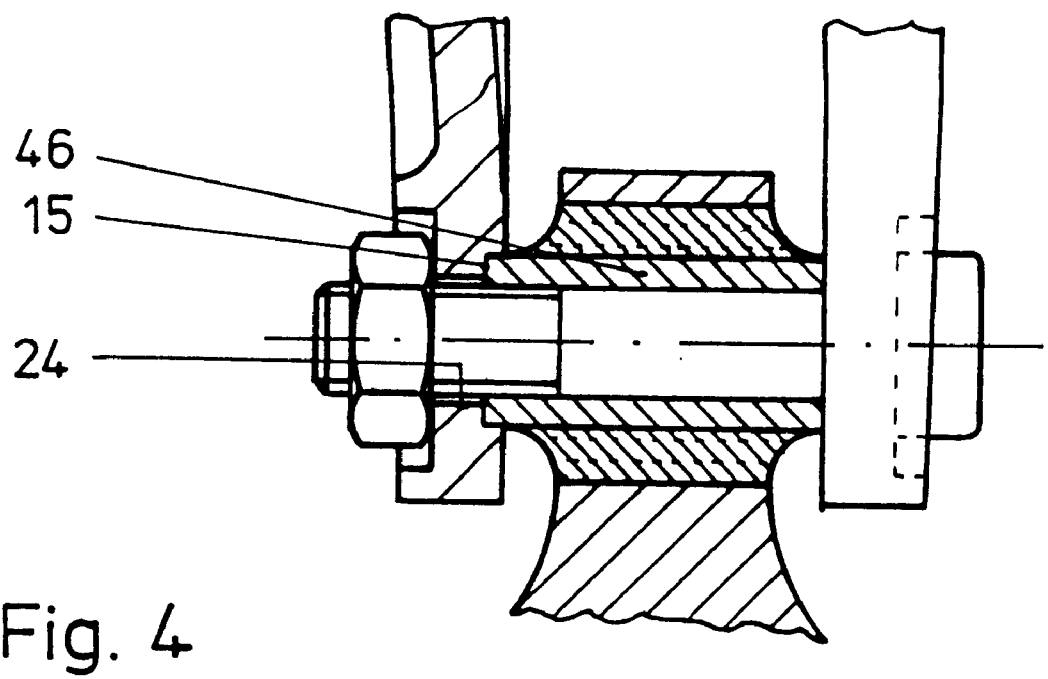
FIG. 4 as FIG. 3 but with a longer sleeve.

FIG. 4 likewise shows the vehicle-body end of the link body. Here too, the support profiles (11, 12) are bolted to one another via a sleeve (46). The sleeve (46) is longer than the sleeve (42) in FIG. 3. Both its ends project into recesses (15). The latter are, for example, arranged concentrically with respect to the pivotal connection hole (24). The sleeve (46) is seated in the recesses (15) by its cylindrical outer contour, for example, by means of a transverse press fit, thus connecting the support profiles (11, 12) positively.

List of reference numerals

| | |
|---|---|
| 1 | Locating link, link body |
| 2 | Centre plane, plane of symmetry |

-continued

List of reference numerals

| | |
|---|---|
| 11, 12 | Support profile |
| 13, 14, 15 | Recesses, cavity |
| 21 | Wheel-carrier mounting hole, mounting hole |
| 22 | Shock-absorber mounting hole, mounting hole |
| 23 | Spring mounting hole, mounting hole |
| 24 | Pivotal connection hole, mounting hole |
| 26 | Support reinforcements, tubular accumulations of material |
| 31 | Swivel-joint body, wheel-carrier side |
| 32 | Sleeve |
| 33 | Elastomer-body shell |
| 41 | Pivotal connection block on the vehicle body |
| 42 | Sleeve |
| 43 | Elastomer body |
| 44 | Bolt |
| 45 | Nut |
| 46 | Sleeve, long |
| 51 | Shock-absorber rod eye |
| 52 | Sleeve |
| 53 | Elastomer body |
| 54 | Bolt |
| 55 | Nut |

While the above description constitutes the preferred embodiment of the invention, it will be appreciated that the invention is susceptible to modification, variation, and change without departing from the proper scope or fair meaning of the accompanying claims.

What is claimed is:

1. A locating link for wheel suspensions of motor vehicles, comprising; an at least two-part link body, the link body including two elongate support profiles which are spaced apart and parallel to one another over at least two-thirds of their length and come into contact at least in the vicinity of a first mounting hole of the link body, the support profiles have second mounting holes aligned with one another and spaced from the first mounting hole, the support profiles are of mirror-symmetrical configuration relative to a centre plane which lies centrally between the support profiles and normal to the centre lines of the first and second mounting holes and in the assembled condition, the support profiles have a cylindrical cavity, which is disposed in the first mounting hole and arranged concentrically with respect to the first mounting hole, in the region in which the support profiles are in direct contact, the inside diameter of the cavity being greater than the diameter of the first mounting hole and the axial length of the cavity being less than the axial length of the first mounting hole and positioned between opposite ends of the first mounting hole.

2. The locating link according to claim 1, wherein the support profiles of the link body have third mounting holes aligned and parallel to one another and spaced from the first and second mounting holes.

3. The locating link according to claim 2 wherein the support profiles are of reinforced design in the regions of at least some of the mounting holes by accumulation of material present there at least over certain areas, and have an I-shaped cross-section over a major portion of their length.

* * * * *

UNITED STATES PATENT AND TRADEMARK OFFICE
CERTIFICATE OF CORRECTION

PATENT NO.    : 6,305,699 B1  Page 1 of 1
DATED         : October 23, 2001
INVENTOR(S)   : Werner König It is certified that error appears in the above-identified patent and that said Letters Patent is hereby corrected as shown below:

<u>Column 1,</u>
Line 50, after "two" please insert -- of the mounting holes present in the support profiles. --.

Signed and Sealed this

Seventeenth Day of September, 2002

Attest:

JAMES E. ROGAN
*Attesting Officer*    *Director of the United States Patent and Trademark Office*